United States Patent
Coats et al.

(10) Patent No.: US 9,180,909 B1
(45) Date of Patent: Nov. 10, 2015

(54) SMART STEERING ASSEMBLY FOR WALKING END CAR OF A PAVING OPERATIONS MACHINE

(71) Applicant: GOMACO Corporation, Ida Grove, IA (US)

(72) Inventors: Robert E. Coats, Sac City, IA (US); Todd Hoaglund, Kiron, IA (US); Lex Jacobson, Battle Creek, IA (US); Kevin L. Klein, Denison, IA (US)

(73) Assignee: GOMACO Corporation, Ida Grove, IA (US)

( * ) Notice: Subject to any disclaimer, the term of this patent is extended or adjusted under 35 U.S.C. 154(b) by 0 days.

(21) Appl. No.: 14/308,304

(22) Filed: Jun. 18, 2014

Related U.S. Application Data

(63) Continuation of application No. 14/172,461, filed on Feb. 4, 2014.

(51) Int. Cl.
*E01C 23/02* (2006.01)
*B62D 11/00* (2006.01)
*E01C 23/05* (2006.01)

(52) U.S. Cl.
CPC .............. *B62D 11/003* (2013.01); *E01C 23/05* (2013.01)

(58) Field of Classification Search
CPC .............................. B62D 11/003; E01C 23/05
USPC .................................. 404/83, 84.05–85, 118
See application file for complete search history.

(56) References Cited

U.S. PATENT DOCUMENTS

| | | | | |
|---|---|---|---|---|
| 4,029,165 A | * | 6/1977 | Miller et al. | 180/6.48 |
| 5,318,378 A | * | 6/1994 | Lent | 404/75 |
| 5,941,658 A | * | 8/1999 | Dahlinger et al. | 404/84.1 |
| 2003/0180092 A1 | * | 9/2003 | Piccoli | 404/98 |
| 2007/0059098 A1 | * | 3/2007 | Mayfield et al. | 404/84.5 |
| 2010/0021234 A1 | * | 1/2010 | Willis et al. | 404/90 |
| 2011/0236129 A1 | * | 9/2011 | Guntert et al. | 404/72 |

* cited by examiner

*Primary Examiner* — Raymond W Addie
(74) *Attorney, Agent, or Firm* — Suiter Swantz pc llo

(57) ABSTRACT

A smart steering assembly for a modularly configurable paving operations system includes an end structure at either end of a modular framework. Each end structure has a front and rear adjustable leg with a steerable crawler connected to each leg. A control system can rotate one or more steerable crawlers via the smart steering assembly to drive, steer, or reconfigure the system in response to user input or data received from one or more sensors. Steerable crawlers may be articulated independently or in unison via smart steering cylinders or actuators incorporating onboard sensors connected to the control system. Adjustable legs may alternatively be mounted to the end structure via leg pivots.

19 Claims, 10 Drawing Sheets

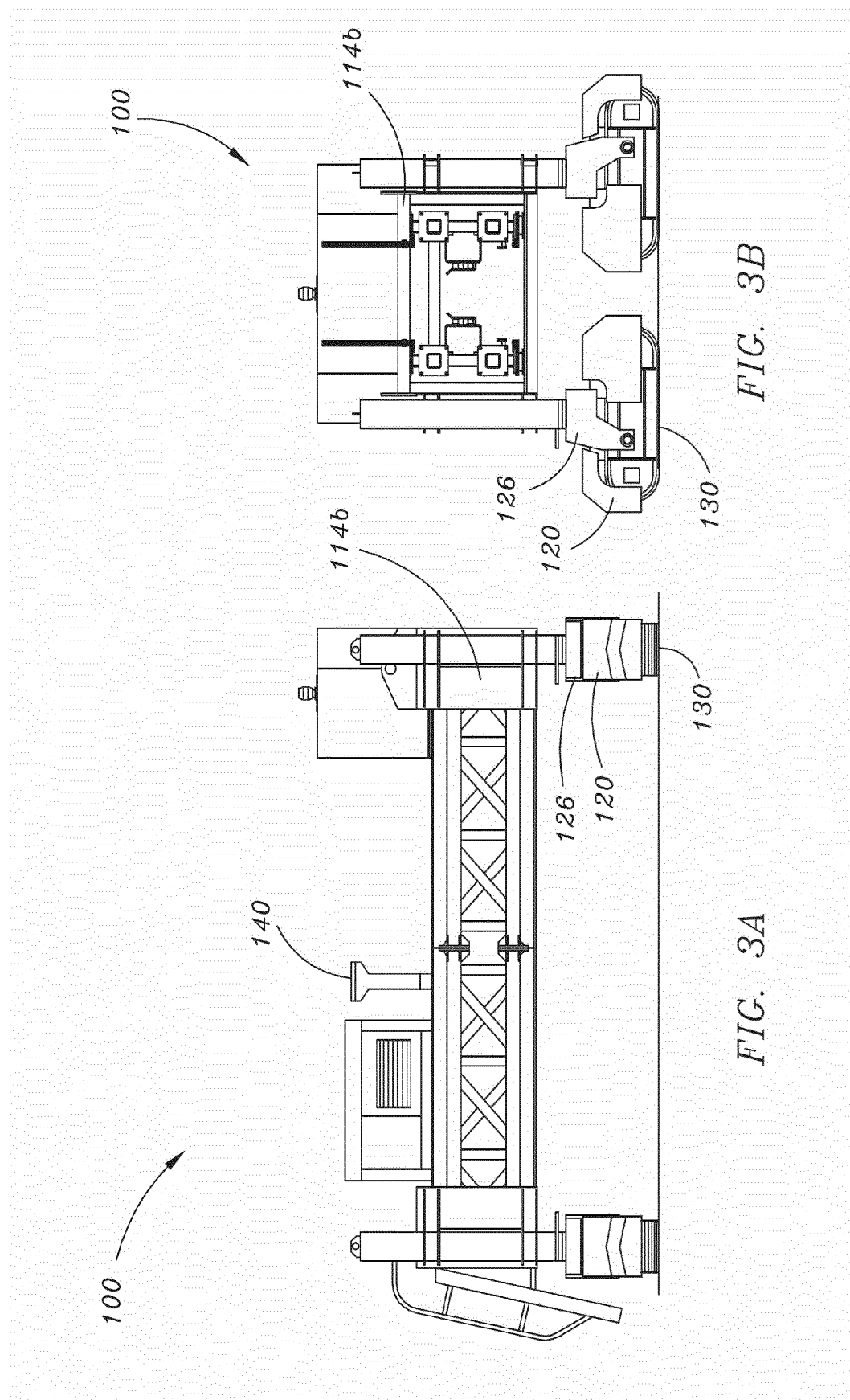

SMART STEERING ASSEMBLY FOR WALKING END CAR OF A PAVING OPERATIONS MACHINE

CROSS-REFERENCE TO RELATED APPLICATIONS

The present application is a continuation of, and claims priority under 35 U.S.C. §120 to, U.S. patent application Ser. No. 14/172,461, filed Feb. 4, 2014, entitled Modular Configurable Paving Apparatus and Modular Configurable Paving Operation System, now pending. Said U.S. patent application is herein incorporated by reference in its entirety.

TECHNICAL FIELD

The present invention relates generally to the field of paving operations, and more particularly to paving machines with component/assembly modularity for ease of manufacture, improved user reconfigurability, and improved transportability.

BACKGROUND

Paving machines (such as texture/cure machines or like paving operations systems) are typically 2-track or 4-track (incorporating single-track or double-track end cars respectively), single-beam or multiple-beam, a first width or a second width, a first length or a second length, or a single tool, dual tool, or multi-tool (accessory). Two-track machines skid steer with the potential for variance in the perpendicularity of the machine to the slab, causing distortions to the parallelism of the grooves to the slab's edge. 4-track steerable machines negate this shortcoming with increased complexity.

Paving depth, surface preparation, transitions (slope and slab) and the like have traditionally been controlled by grade control with or without a hinge mechanism (crown transitions). Transition Adjustment (TA) sections add much in the way of cost and complexity to the frame. Groove depth error is subject to error in the control of crown angle in both the paver and the texture machines.

Paving equipment, including most paving machine frameworks and components, are generally designed and constructed to accommodate varying surface widths and/or tools/accessories. This is done through combinations of fixed-width modular structures and telescoping modular structures. A fixed structural support or bolster is fitted to the end of the machine framework by joining it to the grade control legs. End cars or other end structures must be detached to add or remove fixed-width frame members, and telescoping structures used for width changes add cost and complexity.

SUMMARY

Embodiments of the present invention are directed to a paving operations system having a modular framework that incorporates a rail system to facilitate mounting of accessories/components and support of the framework by an end structure, or end car, at either end of the framework. This allows for repositioning an end structure relative to the modular framework and adjusting the operating width of the system without the complexity of a telescoping frame member. The end structure and accessories may be moved along the framework by lateral sliding action along the rail system. Additional modular frame members may be added to or removed from the main framework's outside end without removal of end structure, which is simply moved along the framework to its new position.

Preferred embodiments of the paving operations system incorporate a steering assembly at each end structure configured to convert the system between an operational/paving configuration and a transitional configuration. The steering assembly can utilize sensor-equipped steering cylinders to rotate steerable crawlers mounted to the end structures individually or in unison. Through a control system, the steering assembly can direct the position of the system and make precise steering corrections. The steering assembly can also position the steerable crawlers on one side of the system for lateral movement of an end structure along the modular framework to a new position.

In preferred embodiments, the modular framework of the system may be fitted with or connected to a range of accessories such as materials pans, spreader plows, longitudinal and transverse texture rakes, dowel bar inserters, burlap drags, pavement cure distributors, finishing screeds, or surface trimming systems. A paving operations system thus assembled from a selection of modular components and accessories can accommodate a diverse range of functionalities through a single base apparatus. For example, embodiments of the system may include an undercarriage fitted with pan and spreader accessories for paving a surface. Undercarriage accessories can then be swapped out for texturing accessories connected to the control system for precise tining and crowning, and later swapped out again for pavement curing accessories. In embodiments, the system incorporates sonic slab tracking and closed loop control of the grooving rake's position in addition to the machine's grade control to govern tining depth both for longitudinal and transverse grooves through any crown variance. Such a configuration preferably permits precise control without the added complexity of hinge mechanisms for crowning.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The advantages of the invention may be better understood by those skilled in the art by reference to the accompanying figures in which:

FIG. 3A is a front elevational view of an embodiment of the paving operations system in an operational/paving configuration;

FIG. 3B is an end elevational view of an embodiment of the paving operations system in an operational/paving configuration illustrating means for attaching an additional frame insert to a walking end car;

DETAILED DESCRIPTION

Features of the present invention in its various embodiments are exemplified by the following descriptions with reference to the accompanying drawings, which describe the present invention with further detail. These drawings depict only selected embodiments of the present invention, and should not be considered to limit its scope in any way.

Figure 1:
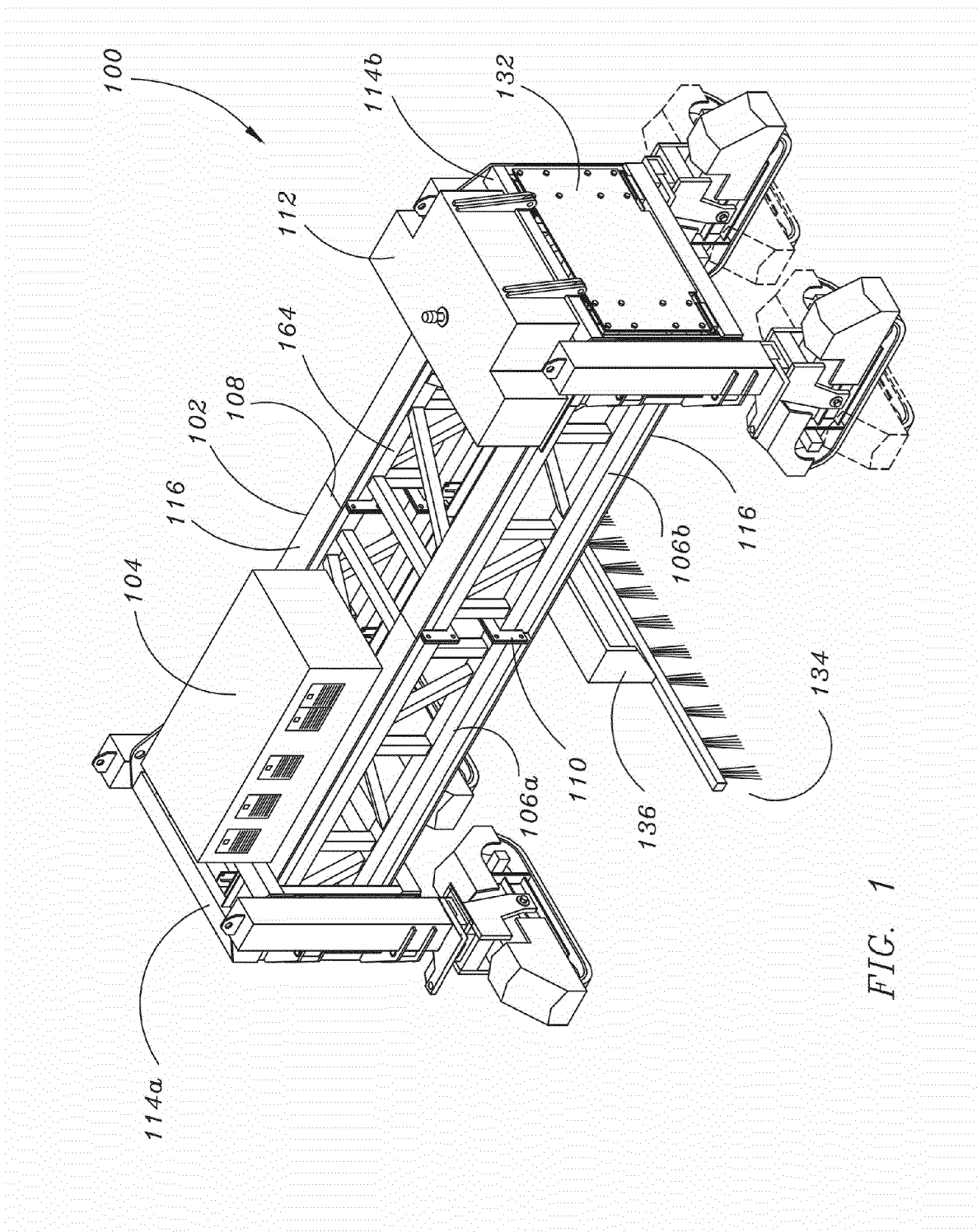
FIG. 1 is a perspective view of a four-track paving operations system having a readily extendable transverse width adjustment according to an embodiment of the present invention.

FIG. 1 depicts an embodiment of a paving operations system 100 of the present invention. System 100 includes a modular framework 102 supported at either end by drive end car 114a and walking end car 114b. Modular framework 102 includes individual frame members 106a and 106b. In preferred embodiments, modular framework 102 incorporates structural tube or lattice type framing, and individual frame members 106 may be assembled from prefabricated and pre-sized frame panels 164. Frame members 106a and 106b include a series of frame mount flanges 110, by which frame members 106a and 106b may be bolted to each other or to end cars 114a and 114b via attachment plate 132. In embodiments, modular framework 102 includes a rail system 116 along its top and bottom sides for mounting accessories to modular framework 102 as well as support of the framework by end cars 114a and 114b. Individual rails mounted on frame members 106a and 106b seamlessly contact each other at frame joint 108, where frame members 106a and 106b connect. Rail system 116 allows for simplified system width adjustment via positioning end car 114b relative to modular framework 102 without the complexity of a telescoping frame member. In preferred embodiments, rail system 116 is a T-rail system along which end cars 114a and 114b are configured to laterally slide. Rail system 116 may also incorporate alternative rail/slot designs or guide systems. Additional frame members 106 may be added to, or removed from, modular framework 102 without the detachment of walking end car 114b. System 100 may also include a gasoline engine, diesel engine, or other like engine console 104 bolted to the frame insert 106a directly connected to drive end car 114a. System 100 may similarly include a cure tank or other accessory pod 112 bolted to the frame insert 106b directly connected to walking end car 114b. When not bolted to frame insert 106b, accessory pod 112 can further slide along rail system 116 for repositioning. In embodiments, accessory mount 136 may be connected to the underside of modular framework 102. Accessory mount 136 may, for example, accommodate a texture rake 134 for transverse or longitudinal tining operations, a spray bar assembly 152 for use in conjunction with cure tank 112, or other like functional accessories.

Figure 2:
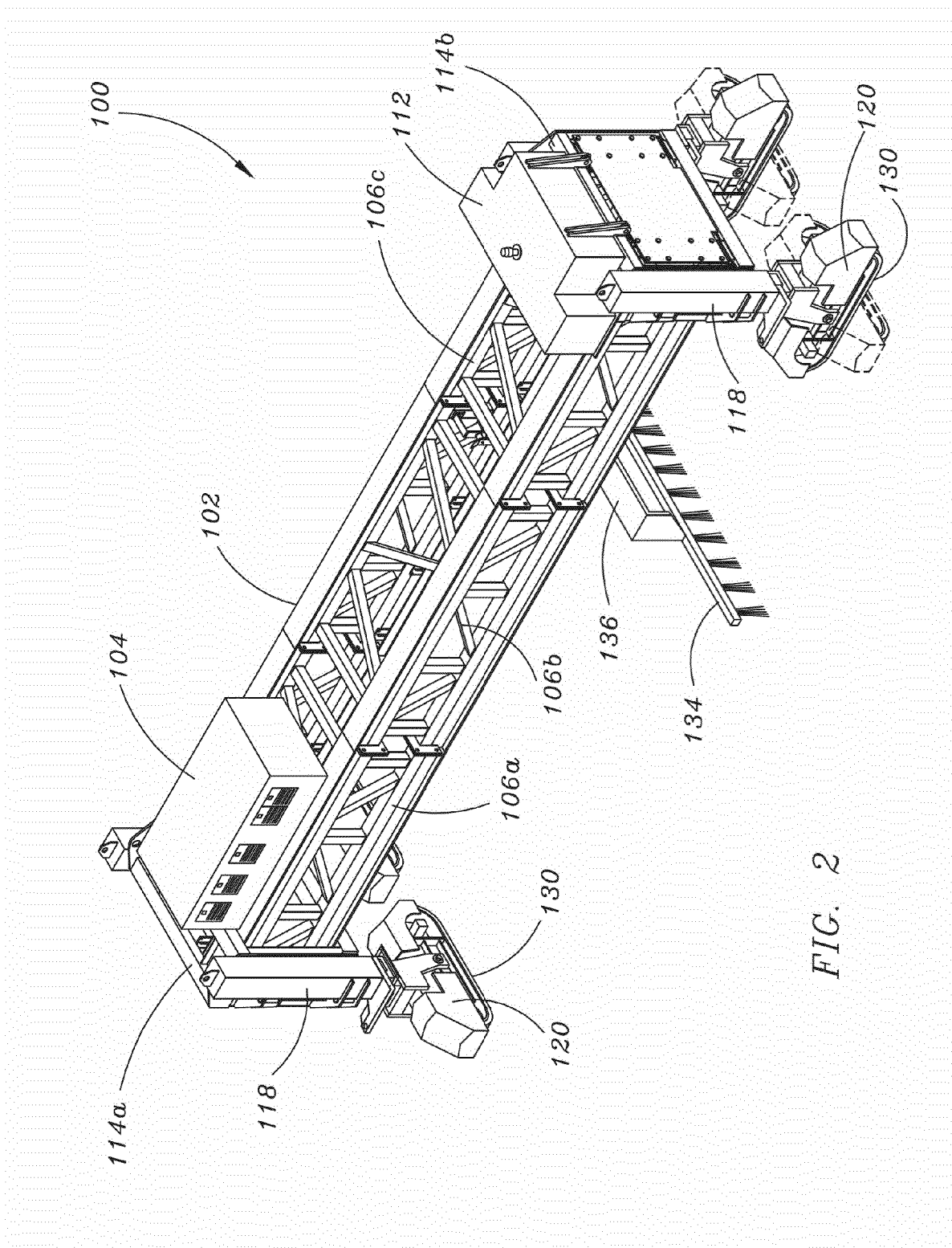
FIG. 2 is a perspective view of an embodiment of the four-track paving operations system extended by the addition of a frame member.

Referring to FIG. 2, drive end car 114a and walking end car 114b further include front and rear legs 118 at each end of system 100 for vertical support. Each leg 118 is equipped with a steerable crawler 120 (including track 130, fender, drive, and drive assembly). In some embodiments, front and rear legs 118 may be configured to hydraulically raise or lower modular framework 102 above ground level. In preferred embodiments, engine console 104 is bolted to the frame member 106a directly connected to drive end car 114a, and accessory pod 112 is bolted to the frame member 106c directly connected to walking end car 114b. Modular framework 102 may include an additional frame member 106b as a result of an operation to extend the width of system 100 and an accessory mount 136 to which texture rake 134 has been transversely mounted. Preferred embodiments of accessory mount 136 can accommodate other accessories or a longitudinally mounted texture rake 134.

Referring to FIGS. 3A and 3B, embodiments of paving operations system 100 may be transitioned into several useful configurations. FIG. 3A illustrates an embodiment of system 100 in an operational/paving configuration. Front steerable crawlers 120 mounted to adjustable legs 118 may be rotated by track mount yokes 126 to an operating orientation both substantially perpendicular to modular framework 102 and substantially parallel to a working surface. Tracks 130 of steerable crawlers 120 contact the ground as system 100 travels along the working surface while a control system electronically maintains the perpendicularity of system 100 to the working surface. In preferred embodiments, operator console 140 may be secured to modular framework 102 to provide the operator of system 100 with a means of interfacing with and directing the control system of system 100. In preferred embodiments, the control system of system 100 may include the control system substantially disclosed in provisional application 61/760,416, herein incorporated in its entirety, or any like combination of hardware and software for controlling the components of system 100. Referring to FIG. 3B, in embodiments of system 100 both front and rear steerable crawlers 120 connected to walking end car 114b may be configured to steer in unison or individually to maintain system 100 in an orientation substantially parallel to the direction of travel along a work surface.

Figure 4A:
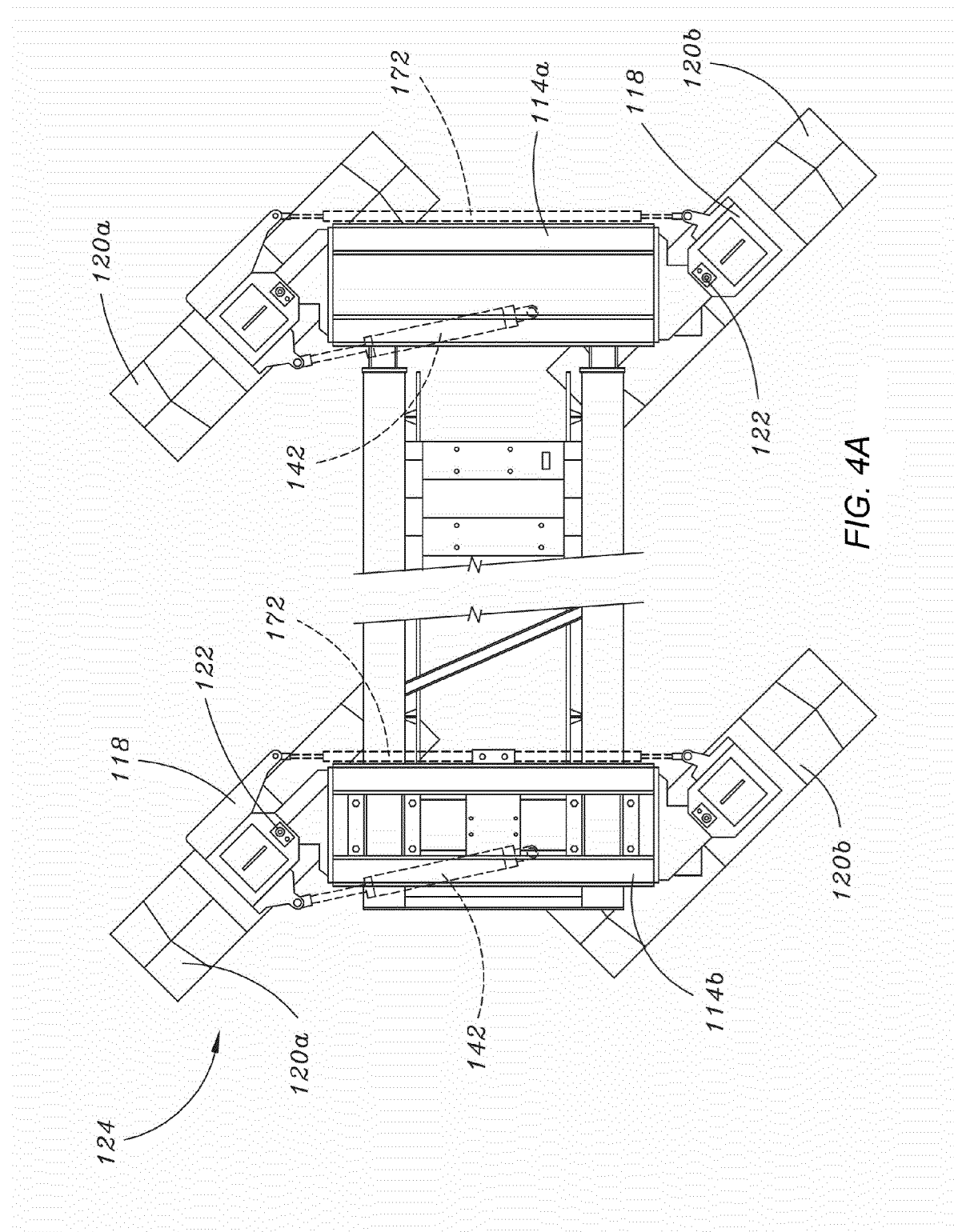
FIG. 4A is a top elevational view of an embodiment of a steering assembly of the present invention.
Figure 4B:
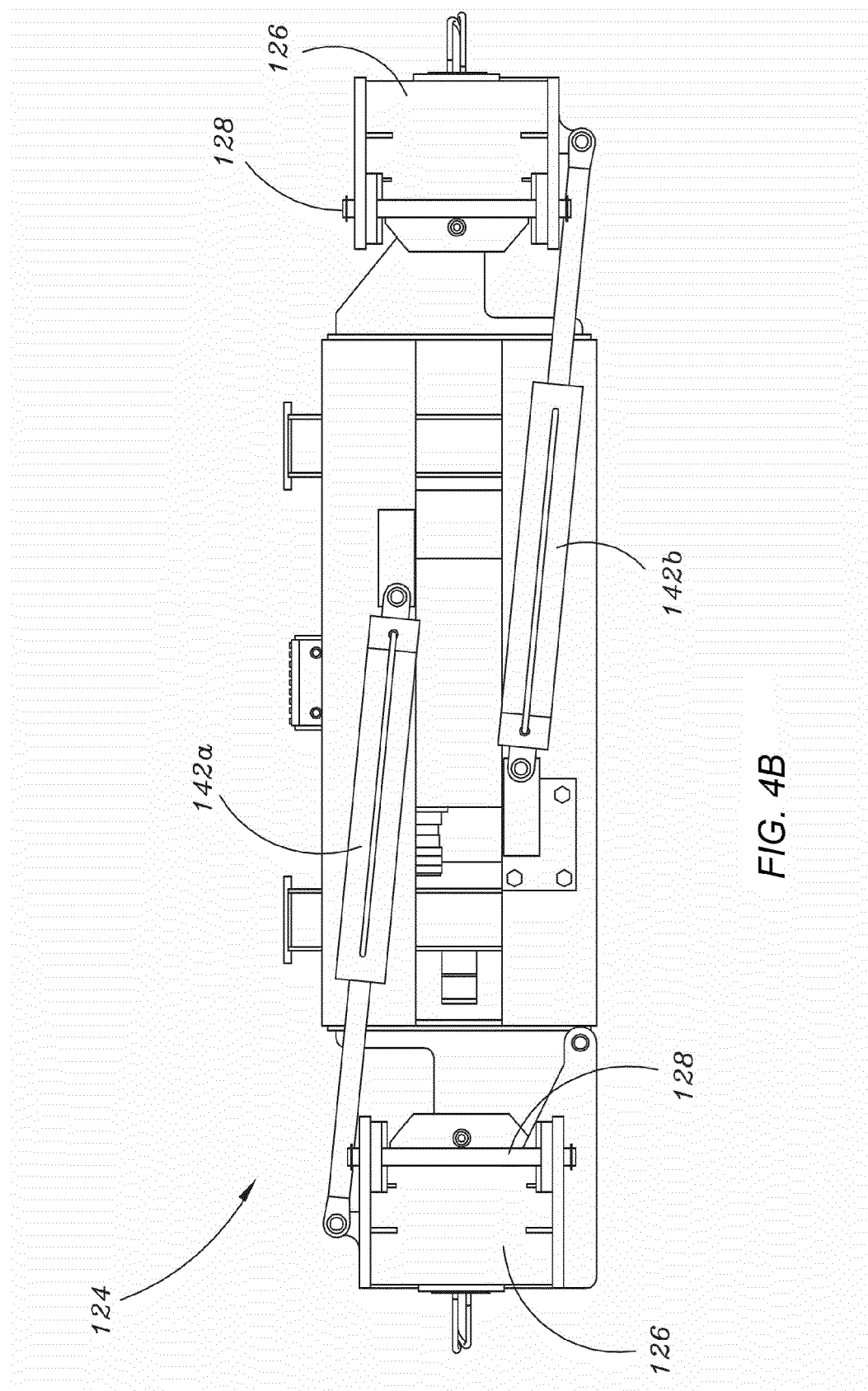
FIG. 4B is a bottom elevational view of an embodiment of a steering assembly of the present invention.

FIGS. 4A and 4B illustrate alternative embodiments of steering assembly 124. Operations to extend or reduce the width of system 100 may require the steerable crawlers 120 at one end of system 100 to steer independently, e.g., for moving an end car 114 along modular framework 102 to a new position while system 100 remains stationary. Similarly, transporting system 100 may require precision steering to maneuver system 100 onto a transport vehicle. Finally, embodiments of system 100 may benefit from electronically controlled crab steering in addition to skid steering for maintaining system 100 in a desired operating orientation while paving, texturing, etc. Referring to FIG. 4A, fixed end cars 114a or telescoping end cars 114b may be connected to adjustable legs 118 via leg pivots 122, and legs 118 are in turn connected to front steerable crawlers 120a and rear steerable crawlers 120b. In embodiments of steering assembly 124, steering cylinder 142 may articulate front steerable crawler 120 to rotate in response to commands from the control system or a user. Steering tie rod 172, connecting front steerable crawler 120a to rear steerable crawler 120b, may then articulate rear steerable crawler 120b to rotate in unison with front steerable crawler 120a.

Referring to FIG. 4B, alternative embodiments of steering assembly 124 may incorporate dual steering cylinders 142a and 142b linked to a track mount yoke 126 and track pin 128, which in turn articulates steerable crawlers 120. In response to commands from the control system of system 100 or a user, steering cylinders 142a and 142b may articulate their respective steering tracks 120 to rotate in unison through track mount yoke 126 and track pin 128. Steering cylinders 142a and 142b may also articulate a single steerable crawler 120 independently to provide precise crab steering corrections in operating and transitional configurations. In preferred embodiments, steering cylinders 142a and 142b are "smart"

hydraulic steering cylinders equipped with sensors configured to continually relay position data to the control system. In preferred embodiments, the control system of system 100 incorporates a steering control system including system controls for electric over hydraulic steering and grade control. Steering assembly 124 may be configured to rotate one or both steerable crawlers 120 through a continuous 90-degree range from an operational orientation (a longitudinal orientation perpendicular to the modular framework) to a transport orientation (a transverse orientation parallel to the modular framework). In preferred embodiments, steering assembly 124 is configured to provide an additional 8 degrees of steering correction. The control system may make steering corrections in response to user input or based on sensor data. For example, a user may input crab steering corrections while configuring system 100 for transport, or the control system may correct steering based on data collected from grade elevation or slab elevation sensors during a texturing operation.

Figure 5A:
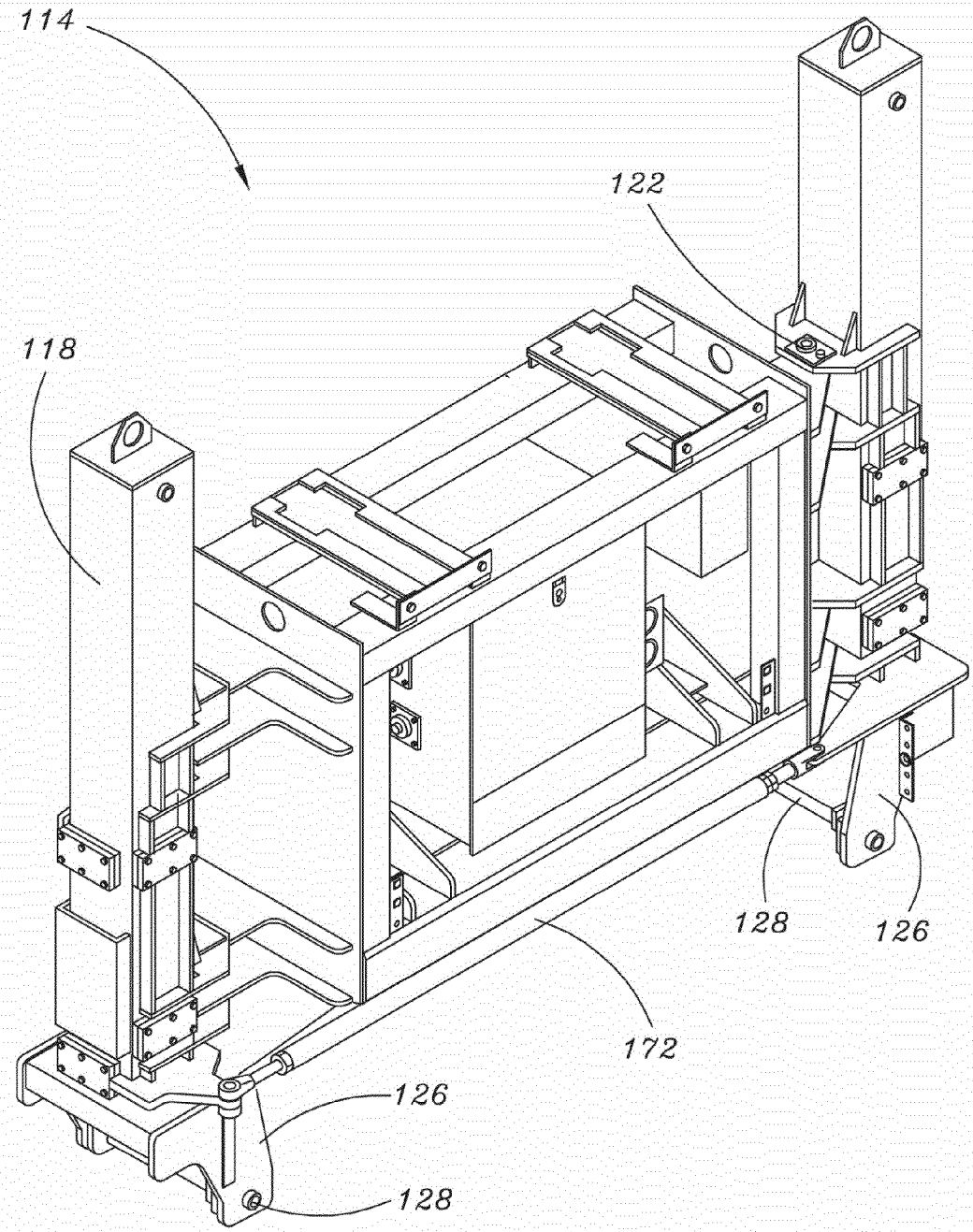
FIG. 5A is an end elevational view of an embodiment of an end frame of the present invention.
Figure 5B:
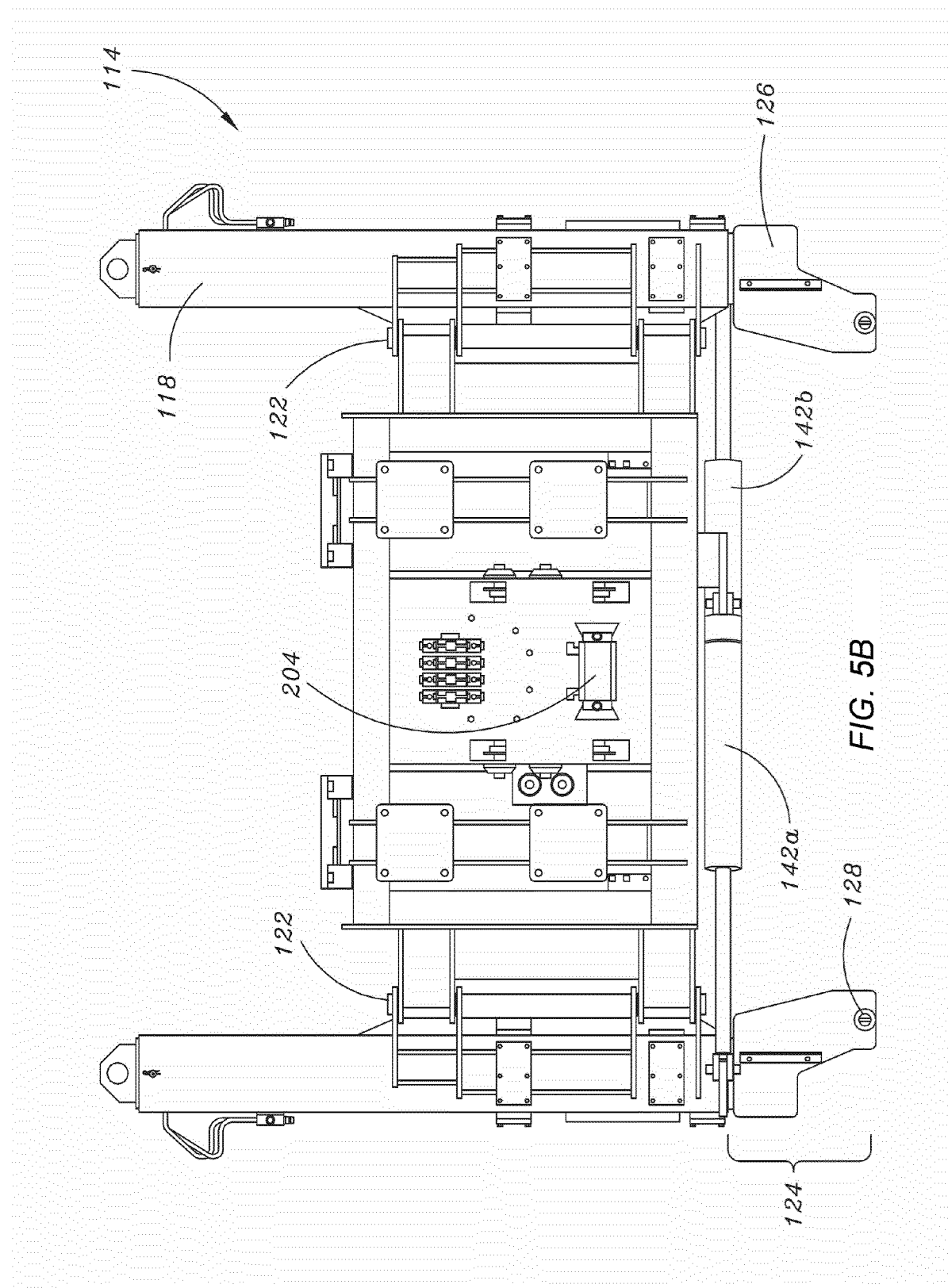
FIG. 5B is an end elevational view of an embodiment of an end frame of the preferred invention.
Figure 6:
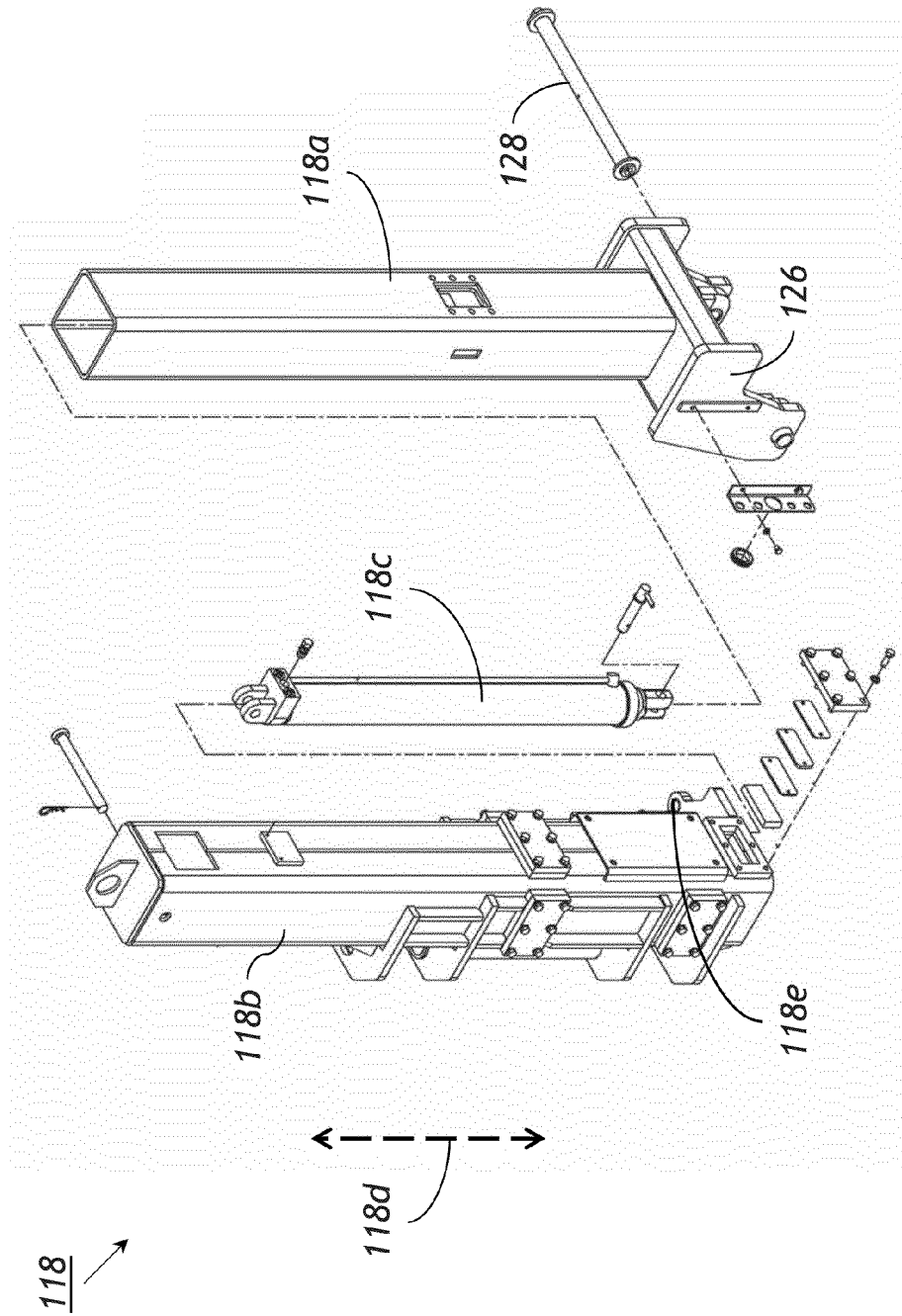
FIG. 6 is an exploded view of jack leg 118.
Figure 7:
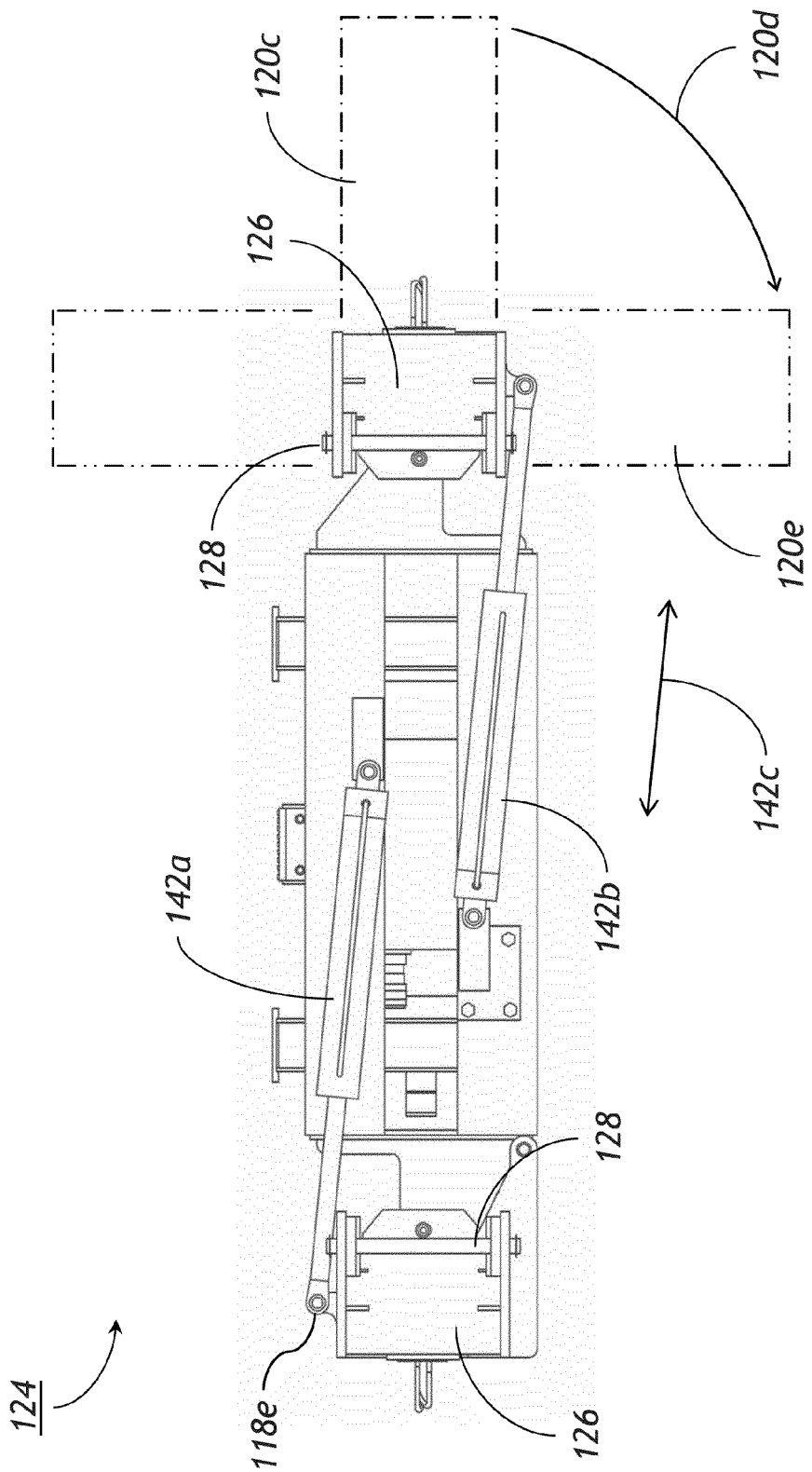
FIG. 7 illustrates the steering assembly 124.
Figure 8:
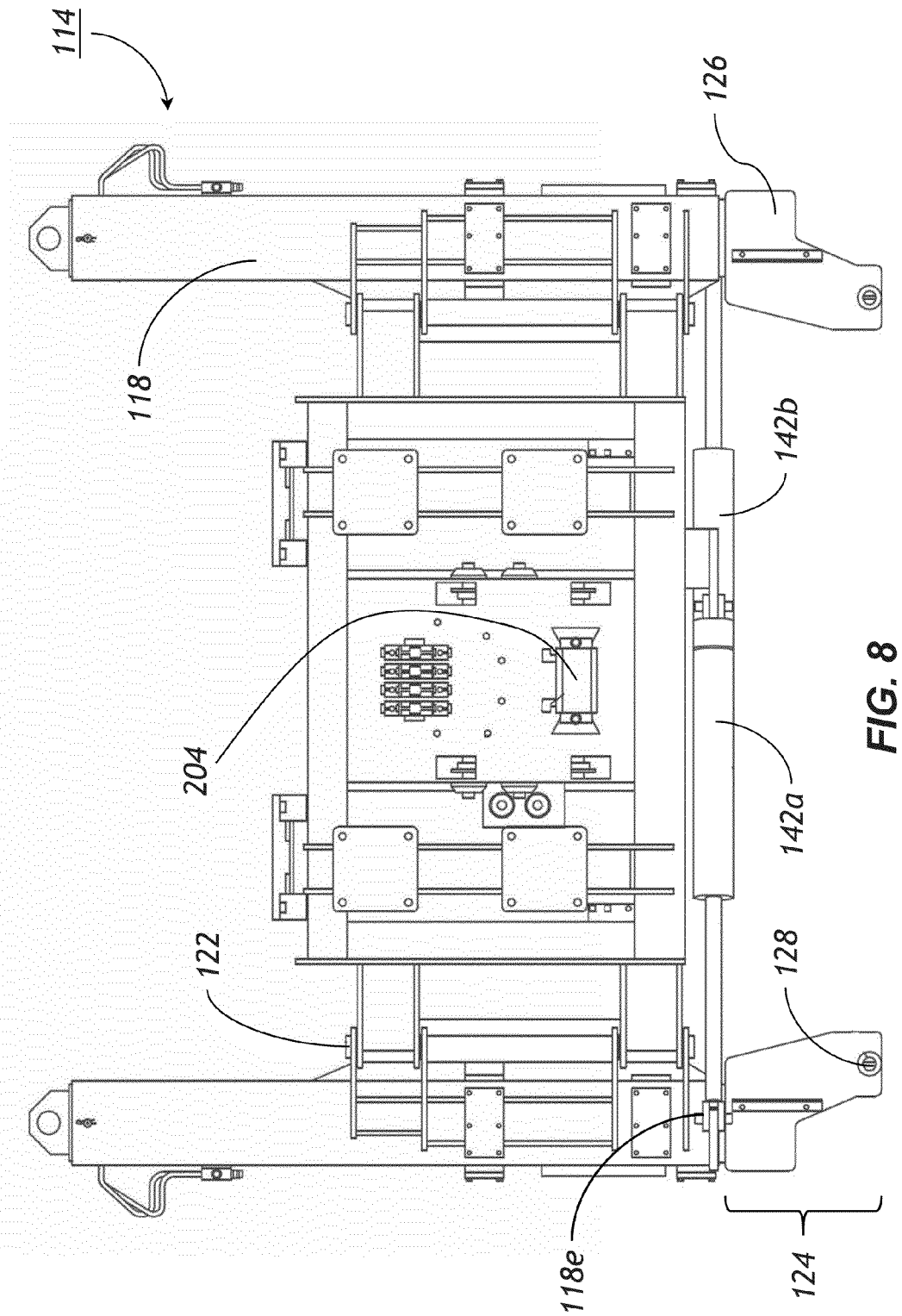
FIG. 8 illustrates an end car 114.

FIGS. 5A and 5B illustrate alternative embodiments of fixed end car 114. Referring to FIG. 5A, adjustable legs 118 may be mounted to end car 114 via leg pivots 122. Steerable crawlers 120 may then be mounted to legs 118 via track mount yoke 126 and track pin 128, so that steerable crawlers 120 may rotate around legs 118; legs 118 may pivot in order to allow steerable crawlers 120 greater mobility without manual adjustments to end car 114 or rerouting of hydraulics and other connections. Embodiments of end car 114 may include a steering assembly 124 incorporating one or more steering cylinders 142, smart steering cylinders, tie rods 172, or other like means for articulating steerable crawlers 120. Steering tie rod 172, for example, may articulate rear steerable crawler 120 in unison with front steerable crawler 120 when front steerable crawler 120 rotates in response to commands from a user or the control system of paving operations system 100.

Referring to FIG. 5B, alternative embodiments of end car 114 may include a steering assembly 124 incorporating dual steering cylinders 142a and 142b, each of which may be configured to articulate a single steerable crawler 120 via track mount yoke 126 and track pin 128. In response to user commands or the control system of paving operations system 100, both steering cylinders 142 may articulate in unison the front and rear steerable crawlers 120 mounted to end car 114 via adjustable legs 118 mounted to end car 114 via leg pivots 122. Embodiments of end car 114 may additionally incorporate a flow divider 204 for use in conjunction with cure tank 112 or spray bar assembly 152.

Those having skill in the art will appreciate that there are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "connected", or "coupled", to each other to achieve the desired functionality, and any two components capable of being so associated may also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. A steerable end car, comprising:
   at least one end structure including at least one adjustable leg pivotably mounted to the end structure, the at least one adjustable leg configured to pivot around a vertical axis; and
   a steering assembly, including
      at least one steerable crawler including a track and coupled to the adjustable leg,
      at least one linear actuator operably coupled to the at least one end structure and to the at least one adjustable leg and configured to articulate the at least one steerable crawler through a range of at least 90 degrees, and
      a steering control system including a user interface and configured to articulate the at least one linear actuator.

2. The steerable end car of claim 1, wherein the at least one linear actuator includes at least one of a hydraulic cylinder and an electro-hydraulic actuator.

3. The steerable end car of claim 1, wherein the at least one linear actuator includes at least one sensor communicatively coupled to the steering control system and configured to (a) determine a position of the at least one steerable crawler and (b) relay the position to the steering control system.

4. The steerable end car of claim 3, wherein the steering control system is configured to articulate the at least one linear actuator in response to at least one of user input and data provided by the at least one sensor.

5. The steerable end car of claim 1, wherein
   the at least one adjustable leg includes a front leg pivotably mounted to the end structure and a rear leg pivotably mounted to the end structure, the front leg and the rear leg configured to pivot around a vertical axis;

the at least one steerable crawler includes at least a front steerable crawler coupled to the front leg and a rear steerable crawler coupled to the rear leg;

the at least one linear actuator includes at least a front actuator operably coupled to the front leg and a rear actuator operably coupled to the rear leg; and the steering control system is configured to articulate at least one of the front actuator and the rear actuator in response to at least one of user input and data provided by the at least one sensor.

6. The steerable end car of claim 5, wherein the steering control system is configured to articulate at least the front actuator and the rear actuator in unison.

7. The steerable end car of claim 6, wherein at least the front actuator and the rear actuator are configured to articulate the front steerable crawler and the rear steerable crawler in unison.

8. The steerable end car of claim 1, wherein the at least one adjustable leg includes at least one linear actuator configured to articulate the steerable end car through a vertical range.

9. The steerable end car of claim 8, wherein the at least one linear actuator includes at least one of a hydraulic cylinder and an electro-hydraulic actuator.

10. The steerable end car of claim 1, wherein the at least one adjustable leg is pivotably mounted to the end structure via at least one leg pivot fixedly coupled to the end structure, the leg pivot including a pin configured to pivot with the at least one adjustable leg.

11. A configurable paving operations system, comprising:
a modular framework having a transverse width and including at least a first end and a second end;
at least a first end structure and a second end structure, the first end structure coupled to the first end and the second end structure coupled to the second end;
each end structure having (1) at least a first adjustable leg and a second adjustable leg pivotably coupled to the end structure and configured to pivot around a vertical axis, (2) at least a first steerable crawler coupled to the first adjustable leg and to the end structure and a second steerable crawler coupled to the second adjustable leg and to the end structure, and (3) a steering assembly including at least a first linear actuator operatively coupled to the first adjustable leg and a second linear actuator operatively coupled to the second adjustable leg, configured to articulate at least the first steerable crawler and the second steerable crawler through a range of at least 90 degrees; and
a control system including a steering control system operably coupled to the at least one steering assembly.

12. The paving operations system of claim 11, wherein the control system includes a user interface.

13. The paving operations system of claim 11, wherein the at least one linear actuator includes at least one of a hydraulic cylinder and an electro-hydraulic actuator.

14. The paving operations system of claim 11, wherein the at least one linear actuator includes at least one sensor communicatively coupled to the steering control system and configured to (a) determine a position of the steerable crawler and (b) relay the position to the steering control system.

15. The paving operations system of claim 14, wherein the steering control system is configured to articulate the at least one linear actuator in response to at least one of user input and data provided by the at least one sensor.

16. The paving operations system of claim 11, wherein the steering control system is configured to articulate the at least one actuator in response to at least one sensor external to the steering assembly.

17. The paving operations system of claim 16, wherein the at least one sensor includes at least one of a grade elevation sensor, a slab elevation sensor, a sonic sensor, an acoustic sensor, a transversely mounted sensor, a longitudinally mounted sensor, and a proximity switch.

18. The paving operations system of claim 11, wherein the steering control system is configured to articulate at least the first linear actuator and the second linear actuator in unison.

19. The paving operations system of claim 18, wherein at least the front actuator and the rear actuator are configured to articulate the front steerable crawler and the rear steerable crawler in unison.

\* \* \* \* \*